US008612176B2

(12) United States Patent
Gilbert

(10) Patent No.: US 8,612,176 B2
(45) Date of Patent: Dec. 17, 2013

(54) NOMINAL POPULATION METRIC: CLUSTERING OF NOMINAL APPLICATION ATTRIBUTES

(75) Inventor: Juan E. Gilbert, Auburn, AL (US)

(73) Assignee: Auburn University, Auburn, AL (US)

( * ) Notice: Subject to any disclaimer, the term of this patent is extended or adjusted under 35 U.S.C. 154(b) by 257 days.

(21) Appl. No.: 12/011,053

(22) Filed: Jan. 23, 2008

(65) Prior Publication Data

US 2008/0183731 A1      Jul. 31, 2008

Related U.S. Application Data

(60) Provisional application No. 60/897,795, filed on Jan. 26, 2007.

(51) Int. Cl.
*G04F 3/00* (2006.01)

(52) U.S. Cl.
CPC ............... *G04F 3/00* (2013.01)
USPC ............................. 702/179; 706/60

(58) Field of Classification Search
USPC ............. 702/81, 82, 84, 179–181; 706/60
See application file for complete search history.

(56) References Cited

U.S. PATENT DOCUMENTS

| | | | |
|---|---|---|---|
| 6,473,898 B1 * | 10/2002 | Waugh et al. | 717/168 |
| 6,487,539 B1 * | 11/2002 | Aggarwal et al. | 705/14.23 |
| 6,567,797 B1 | 5/2003 | Schuetze et al. | 707/2 |
| 6,922,699 B2 | 7/2005 | Schuetze et al. | 707/103 R |
| 7,630,986 B1 * | 12/2009 | Herz et al. | 1/1 |
| 7,720,791 B2 * | 5/2010 | Hyder et al. | 1/1 |
| 2003/0237103 A1 * | 12/2003 | Jacob et al. | 800/14 |
| 2004/0172393 A1 | 9/2004 | Kazi et al. | 707/6 |
| 2004/0181554 A1 * | 9/2004 | Heckerman et al. | 707/104.1 |
| 2005/0273350 A1 * | 12/2005 | Scarborough et al. | 705/1 |
| 2006/0224259 A1 * | 10/2006 | Buil et al. | 700/94 |
| 2006/0229896 A1 * | 10/2006 | Rosen et al. | 705/1 |
| 2006/0282306 A1 * | 12/2006 | Thissen-Roe | 705/11 |
| 2007/0027562 A1 * | 2/2007 | de Voghelaere Parr | 700/91 |
| 2007/0162319 A1 * | 7/2007 | Shapiro et al. | 705/8 |
| 2007/0273909 A1 * | 11/2007 | Chen et al. | 358/1.13 |

OTHER PUBLICATIONS

Bretz, Jr. et al., "The Role of Human Resource Systems in Job Applicant Decision Processes", Journal of Management, vol. 20, No. 3, pp. 531-551, 1994.*
Merriam-Webster's Collegiate Dictionary Tenth Edition, "nominal", 2001.*
Brian S. Everitt, Sabine Landau, and Morven Leese; "Cluster Analysis" Fourth Edition, Bookfirst published 2001 by Hodder Education, part of Hachette Livre UK.

* cited by examiner

*Primary Examiner* — Edward Raymond
(74) *Attorney, Agent, or Firm* — Haverstock & Owens LLP

(57) ABSTRACT

Clustering of nominal attributes using a nominal population metric enables comparisons of entities which are not easily comparable. In some embodiments, nominal population metrics are determined using a similarity matrix and a nominal population matrix using comparisons. In some embodiments, nominal population metrics are determined using a nominal population matrix using distributions. A computing device is able to determine the nominal population metrics with the appropriate hardware and applications configured for computing the nominal population metrics.

19 Claims, 3 Drawing Sheets

NOMINAL POPULATION METRIC: CLUSTERING OF NOMINAL APPLICATION ATTRIBUTES

RELATED APPLICATION(S)

This application claims priority under 35 U.S.C. § 119(e) of the co-pending, co-owned U.S. Provisional Patent Application Ser. No. 60/897,795, filed Jan. 26, 2007, and entitled "NOMINAL POPULATION METRIC: CLUSTERING OF NOMINAL APPLICATION ATTRIBUTES." The Provisional Patent Application Ser. No. 60/897,795, filed Jan. 26, 2007, and entitled "NOMINAL POPULATION METRIC: CLUSTERING OF NOMINAL APPLICATION ATTRIBUTES" is also hereby incorporated by reference in its entirety.

FIELD OF THE INVENTION

The present invention relates to the field of clustering. More specifically, the present invention relates to the field of clustering nominal attributes.

BACKGROUND OF THE INVENTION

When places such as colleges, universities or businesses review applications, certain elements of the applications are easily comparable. For example, if one student has a Grade Point Average (GPA) of 4.0 versus another student with a GPA of 2.5, clearly the GPA of 4.0 is higher. While the GPA is likely weighted against the quality of the school, there are still means of assigning values and computing a score that is easily compared. For example, if the schools are rated by tiers and the first school is rated a 0.9 while the second school is rated a 1.0, the first student receives a score of (4.0*0.9=3.6) versus (2.5*1.0=2.5) with the score of 3.6 being higher/better. However, there are elements in applications which are not easily quantifiable or comparable. Furthermore, there are laws that restrict using some characteristics in certain ways, such as quotas, as they are viewed as discriminatory. For example, it has been ruled unconstitutional to use a quota system to accept a certain number of people of a specific race.

Some attempts have been made for comparing these elements such as race, but they simply utilize a binary system of does the application have this element or not. Such attempts do not provide a sufficient comparison of the applications.

SUMMARY OF THE INVENTION

Clustering of nominal attributes using a nominal population metric enables comparisons of entities which are not easily comparable. In some embodiments, nominal population metrics are determined using a similarity matrix and a nominal population matrix using comparisons. In some embodiments, nominal population metrics are determined using a nominal population matrix using distributions. A computing device is able to determine the nominal population metrics with the appropriate hardware and applications configured for computing the nominal population metrics.

In one aspect, a method of determining nominal population metrics using a computing device comprises comparing one or more attributes from a plurality of entities to obtain one or more difference measures, determining a coverage percentage for attribute pairs based on the one or more attributes and storing the coverage percentage in a memory of the computing device. The coverage percentage is determined by the occurrence frequency of the attribute pairs. The method further comprises determining an inverse coverage percentage by subtracting the coverage percentage from 100%. The method further comprises selecting one or more entities from the plurality of entities based in part on the inverse coverage percentage. The one or more attributes include at least one of race, gender, major, extra curricular activity, wealth, nationality and country of origin. The plurality of entities are selected from the group consisting of admissions applications, job applications and scholarships. The difference measures are contained within a similarity matrix. The attribute pairs and the coverage percentage are contained in a nominal population matrix. The computing device is selected from the group consisting of a personal computer, a laptop computer, a computer workstation, a server, a mainframe computer, a handheld computer, a personal digital assistant, a cellular/mobile telephone, a smart appliance and a gaming console.

In another aspect, a method of determining nominal population metrics using a computing device comprises determining a plurality of distributions for one or more attributes from a plurality of entities, determining nominal differences based on the plurality of distributions and storing the nominal differences in a memory of the computing device. The nominal differences are determined by multiplying two distributions of the plurality of distributions and subtracting the product from 1. The method further comprises selecting one or more entities from the plurality of entities based in part on the nominal differences. The one or more attributes include at least one of race, gender, major, extra curricular activity, wealth, nationality and country of origin. The plurality of entities are selected from the group consisting of admissions applications, job applications and scholarships. The computing device is selected from the group consisting of a personal computer, a laptop computer, a computer workstation, a server, a mainframe computer, a handheld computer, a personal digital assistant, a cellular/mobile telephone, a smart appliance and a gaming console.

In yet another aspect, a method of determining nominal population metrics using a computing device comprises generating a first matrix comprising a first identification column identifying a first set of entities, a second identification column identifying a second set of entities and a difference measure column containing a difference amount between a first entity identified in the first identification column and a second entity identified in the second identification column, generating a second matrix comprising an attribute pair column containing a set of attribute pairs and a coverage column containing coverage data based on similarities of the attribute pairs in the attribute pair column, generating a third matrix comprising the attribute pair column containing the set of attribute pairs and an inverse coverage column containing inverse coverage data based on the coverage data and storing the third matrix in a memory of the computing device. The inverse coverage data is the result of the coverage data subtracted from 100%. The set of attribute pairs is related to at least one of race, gender, major, extra curricular activity, wealth, nationality and country of origin. The first set of entities and the second set of entities are selected from the group consisting of admissions applications, job applications and scholarships. The computing device is selected from the group consisting of a personal computer, a laptop computer, a computer workstation, a server, a mainframe computer, a handheld computer, a personal digital assistant, a cellular/mobile telephone, a smart appliance and a gaming console.

In another aspect, a method of determining nominal population metrics using a computing device comprises generating a matrix comprising an attribute column containing a plurality of attributes and a distribution column containing distribution percentages of the plurality of attributes, computing a nominal difference utilizing the distribution percentages of the plurality of attributes from the distribution column and storing the nominal difference in a memory in the computing device.

In yet another aspect, a computing device comprises a processor, a memory coupled to the processor and an application stored in the memory and processed by the processor, the application for comparing one or more attributes from a plurality of entities to obtain a difference measure and determining a coverage percentage for attribute pairs based on the one or more attributes. The coverage percentage is determined by the occurrence frequency of the attribute pairs. The application further determines an inverse coverage percentage from the coverage percentage by subtracting the coverage percentage from 100%.

In another aspect, an apparatus comprises a processing component, a memory component coupled to the processing component and an application component stored in the memory component and processed by the processing component, the application component for comparing one or more attributes from a plurality of entities to obtain a difference measure and determining a coverage percentage for attribute pairs based on the one or more attributes.

DETAILED DESCRIPTION OF THE PREFERRED EMBODIMENT

Figure 1:
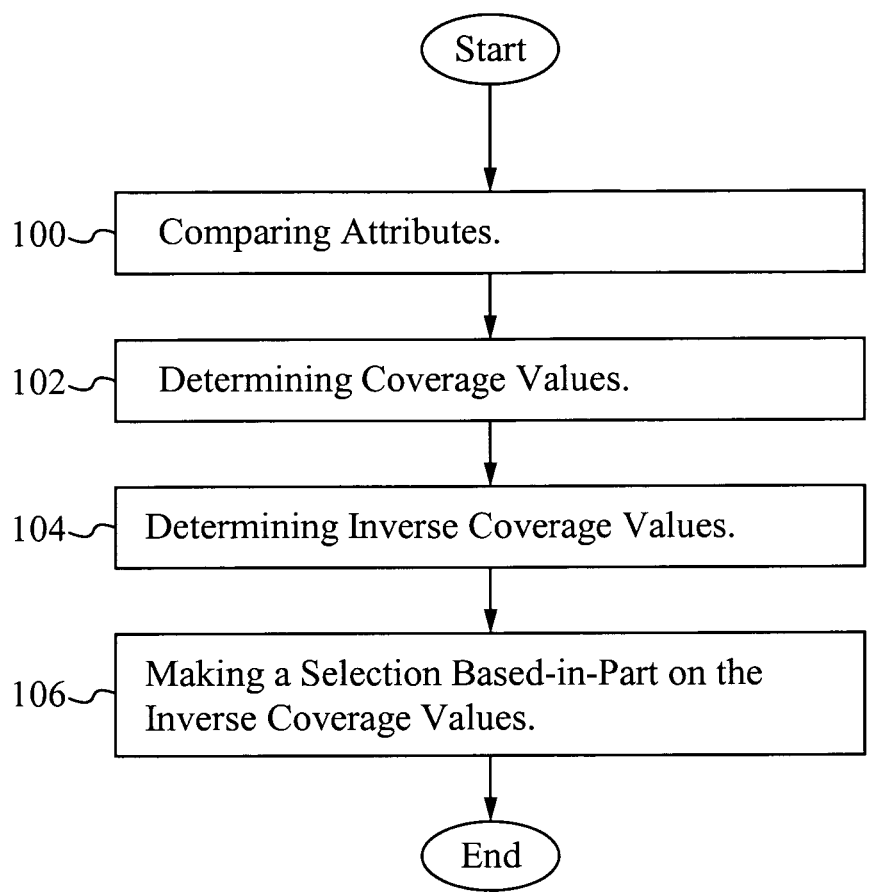
FIG. 1 illustrates a flowchart of a process according to an embodiment of the present invention.

In most clustering or data mining applications, nominal attributes are assigned a value that allows them to be compared. This is common practice and requires some analysis of the nominal attributes to determine the value system. Nominal attributes are those that do not have numerical values; therefore, measuring the similarity or difference between nominal attribute values is very difficult. Race, gender, major, extra curricular activity, wealth, nationality and country of origin are just a few examples. In order to provide an accurate measure for comparing nominal attributes, the Nominal Population Metric (NPM) is able to be used. The NPM is able to be used for analyzing a variety of entities such as admissions applications, job applications, scholarships and more.

The NPM begins by identifying the nominal attributes. For example purposes, the attribute Race is discussed below. The example also assumes there are 20 applications in the applicant pool where Race is one of many attributes. In this example, the unique values for Race are W—White, B—Black, H—Hispanic, A—Asian and O—Other. Every application is compared to every other application. This results in 190 total combinations for 20 applications compared 2 at a time. The number of total combinations is able to be calculated using n C r=n!/[(n−r)! r!], where n=20 and r=2. If these combination pairs are placed into a matrix with application pairs side by side, the NPM is able be utilized to process the nominal attributes as follows:

1. Compute the total number of combinations for all applications using n C r. In this example, this is 190. A difference measure is determined by the differences between the applications. For example, differences such as gender, major, extra curricular activity, wealth, nationality and country of origin are able to be measured. The comparison of the applications with the respective difference measures is referred to as the application similarity matrix, Table 1.

TABLE 1

Example Similarity Matrix with Difference Measures

| Application ID1 | Application ID2 | Difference Measure |
| --- | --- | --- |
| 1 | 2 | 20% |
| 1 | 3 | 15% |
| 1 | 4 | 75% |
| . | . | . |
| . | . | . |
| . | . | . |
| 19 | 20 | 10% |

2. Compute number of unique nominal attribute values. In this case, Race has 5 unique values (White, Black, Hispanic, Asian and Other).

3. Compute the number of combinations for the unique nominal values using n C r. In this case, n=5 and r=2, which yields 10 combinations for Race.

4. For those 10 combinations of the nominal attribute value pairs, compute the coverage percentage within the application similarity matrix. In other words, how many rows in the application similarity matrix have a value for Race pairs of White-Black (W-B), White-Hispanic (W-H), Black-Asian (B-A) and so on? These figures are placed into a nominal population matrix, Table 2.

TABLE 2

Example Nominal Population Matrix

| Race | Coverage |
| --- | --- |
| W-B | 30% |
| W-H | 15% |
| B-A | 5% |
| . | . |
| . | . |
| . | . |

5. The nominal population matrix shows nominal attribute pair coverage across all comparisons. This is an accurate measure of the impact of the nominal attribute value pairs based on their actual existence within the data population. The next step in this process is to adjust the Coverage values if necessary. The adjustment is the desired goal when the application is measuring difference vs. similarity. In Table 2, the W-B Race pair has the greatest Coverage in the nominal population matrix. Therefore, it is the most common attribute value pair. The B-A pair is the least common or most novel. Therefore, when measuring difference, the B-A pair is given more credit because it is the most novel. This credit is calculated proportionally speaking to the other attribute value pairs. This is accomplished by subtracting the Coverage values from 100% or 1.00, as shown in Table 3. This inverts the Coverage values such that B-A is given more credit versus W-B relative to their actual coverage within the similarity matrix.

TABLE 3

| Example Nominal Population Matrix | |
|---|---|
| Race | Coverage |
| W-B | 70% |
| W-H | 85% |
| B-A | 95% |
| . | . |
| . | . |
| . | . |

6. The Coverage values in the nominal population matrix are now the Nominal Population Metrics that are able to be used in clustering algorithms to accurately compare nominal attribute values. To answer the question, "What's the difference between a Black and Asian along the Race attribute?" The NPM value is returned as 95% in this example.

Nominal Population Adjusted for Faster Computation

An alternative approach to using the attribute pairs is to use the distribution values for each attribute. Using the previous example with Race, analysis is performed using the alternative approach. Table 4 shows the distribution of race within the base table, e.g. 70% of the rows have a 'W' for Race.

TABLE 4

| Example Nominal Population Matrix | |
|---|---|
| Race | Distribution |
| B | 10% |
| W | 70% |
| A | 15% |
| H | 5% |
| Other | 0% |

1. Calculate the distribution for each nominal attribute as seen in Table 4. The distribution is calculated based on the number of occurrences of each nominal attribute.
2. When the time comes to calculate the difference between two values of a nominal attribute, the Distribution values are retrieved for each of those attribute values. For example, if calculating the difference between B and A along the Race attribute, 0.1 and 0.15 are retrieved, respectively.
3. Calculate the Nominal difference by multiplying the two values and subtracting the product from 1 or 100%. Using the example in the previous point, the result is 1−(0.1*0.15), which yields 0.985. Therefore, the difference between a Black and an Asian along the attribute of Race is 98.5% difference versus Black and White which yields 1−(0.1*0.7)=0.93=>93%. Note that the Black-Asian difference is greater than the Black-White difference as represented by their distribution in the original population.

In general, the Nominal Population Metric covers any use of the distribution of the nominal attribute values to determine the difference or similarity between nominal attribute values.

FIG. 1 illustrates a flowchart of a process according to an embodiment of the present invention. In the step 100, attributes (e.g. race) of entities (e.g. applications) are compared. In some embodiments, the attributes are stored and compared in a computer memory. In some embodiments, a similarity matrix is determined to compare the attributes. The similarity matrix comprises a plurality of identification columns and a difference measure column. The identification columns include rows so that every entity is compared with every other entity. As shown in Table 1 above, Application 1 is compared with Application 2, Application 1 is compared with Application 3, and so on. Each entity is compared and a difference measure is determined/generated. The difference measure is determined by finding the differences between the entities. In the step 102, a coverage value or percentage is determined. In some embodiments, the coverage value/percentage is stored in a computer memory. In some embodiments, a nominal population matrix is determined/generated which is used to determine the coverage percentage. The nominal population matrix is determined by computing the number of unique nominal attributes (for example, 5 for race). The number of combinations (or attribute pairs) for the unique nominal values is also computed (for example, 10 for race). Then, the coverage percentage is computed based on the similarity matrix for the 10 combinations. The nominal population matrix includes a first column for the combinations/attribute pairs and a second column for the coverage percentage as shown in Table 2. The nominal population matrix indicates the combinations where the higher the number the more common the combination. In some embodiments, an inverse coverage value or percentage is determined in the step 104. In some embodiments, the inverse coverage value/percentage is stored in a computer memory. In some embodiments, a nominal population matrix with inversed coverage is determined to determine the inverse coverage percentage. The coverage percentage is subtracted from 100% which inverts the coverage values to provide the unique combinations with a higher coverage value. A first column includes the combinations/attribute pairs and the second column includes the inverted coverage values as shown in Table 3. The coverage values in the nominal population matrix with inversed coverage are then able to be used in clustering algorithms to accurately compare nominal attribute values. In some embodiments, in the step 106, one or more selections are made based in part or in whole on the inverse coverage values. For example, a university utilizes the inversed coverage values in addition to numerical values for items such as GPA and SAT scores in a formula to admit students with the highest total score. In some embodiments, any and/or all of the steps of FIG. 1 are executed in a computer memory.

Figure 2:
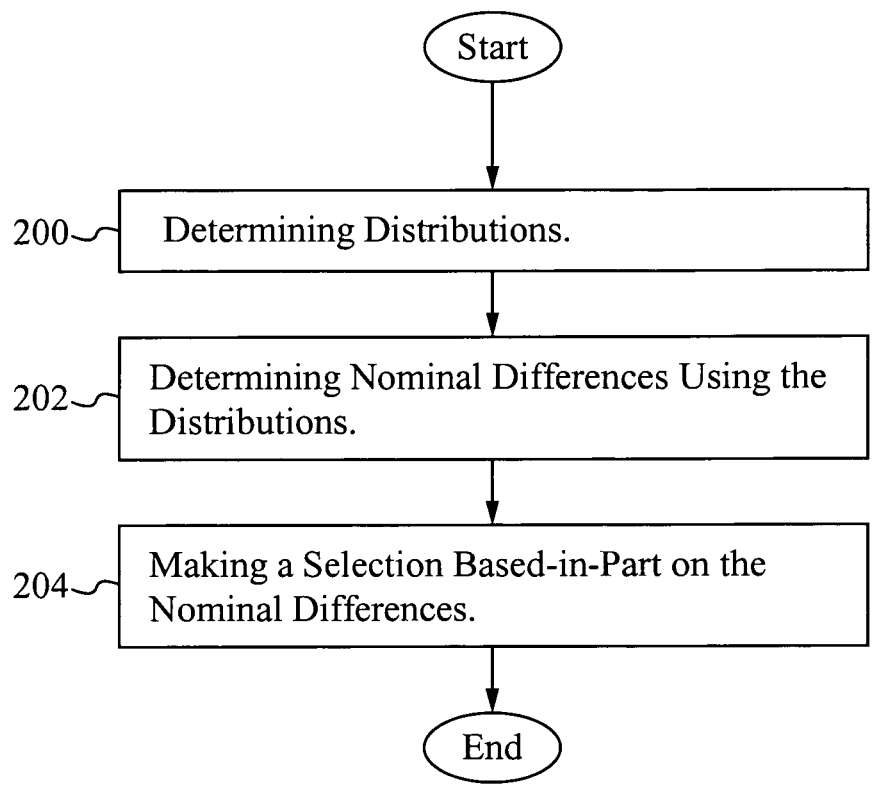
FIG. 2 illustrates a flowchart of a process according to an embodiment of the present invention.

FIG. 2 illustrates a flowchart of a process according to an embodiment of the present invention. In the step 200, a distribution for each nominal attribute is determined/computed as shown in Table 4. In some embodiments, the distribution is determined in a computer memory. The distribution is determined based on data within each entity (e.g. application). In the step 202, a nominal difference metric is determined from the distributions by multiplying values of two separate rows and subtracting the result from 1. In some embodiments, the nominal difference metric is determined in a computer memory. For example, using B and A, the equation is 1−(0.10*0.15)=0.985. Therefore, the nominal difference metric in percentage form between a Black and an Asian is 98.5%. In some embodiments, in the step 204, one or more selections are made based in part or in whole on the nominal difference metric. For example, the nominal difference metric is able to be used for admitting students to college. In some embodiments, any and/or all of the steps of FIG. 2 are executed in a computer memory.

Although matrices have been described above, any configuration for storing the computations/results is possible.

Figure 3:
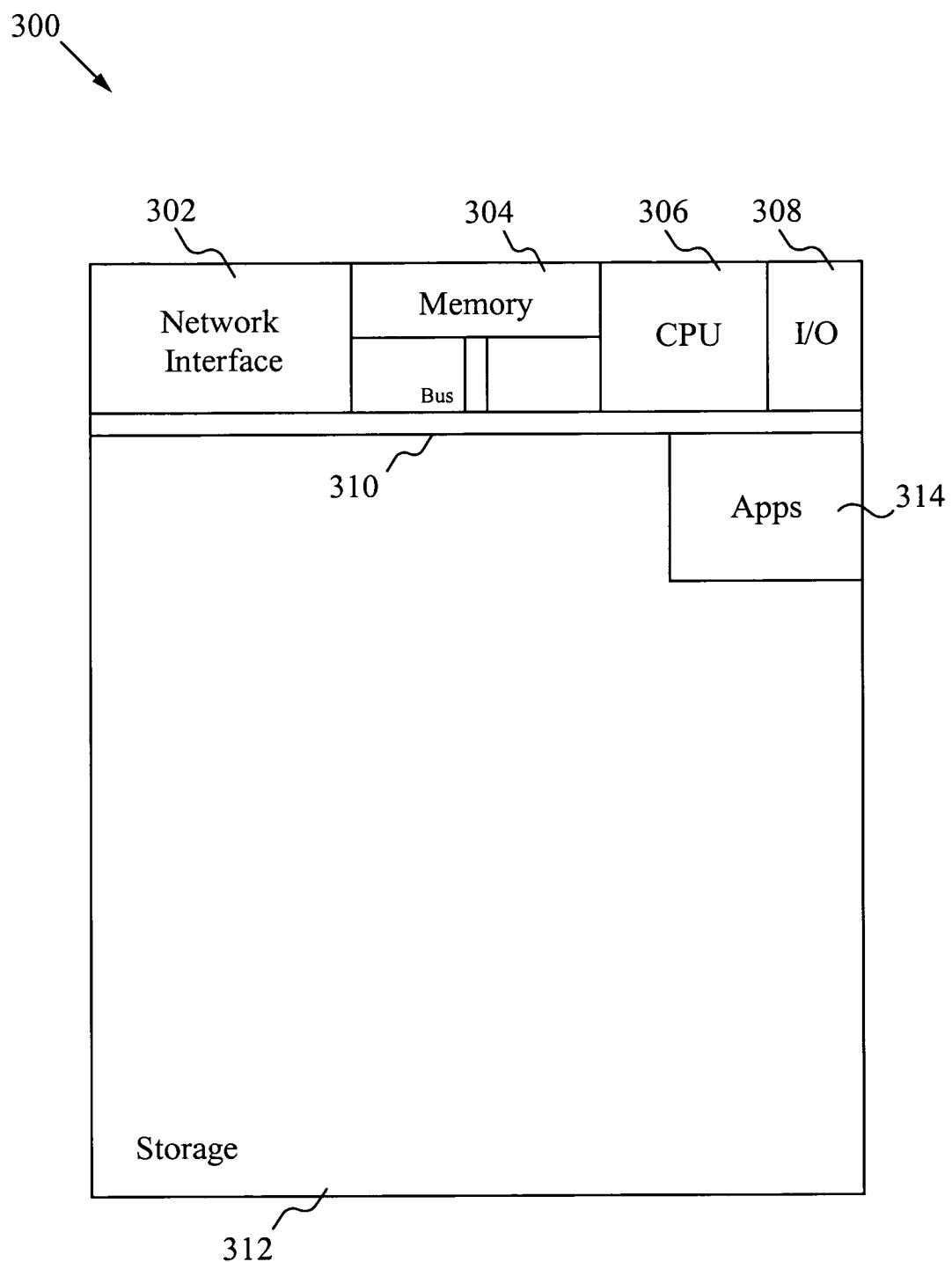
FIG. 3 illustrates a graphical representation of a computing device according to an embodiment of the present invention.

FIG. 3 illustrates a graphical representation of a computing device according to an embodiment of the present invention. The computing device 300 is able to be used to store, serve, compute, communicate and/or display information. For example, a computing device 300 is able to store entities, such as admissions applications. The computing device 300 is also able to store data from the entities appropriately such as in any data structure and/or database. The computing device 300 is able to compute results and values based on the entities and instructions supplied. For example, the computing device 300 is able to execute an application or applications 314 which implement the methods described in relation to FIGS. 1 and 2. In general, a hardware structure suitable for implementing the computing device includes a network interface 302, a memory 304, processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, flash memory card or any other storage device. The computing device is able to include one or more network interfaces 302. An example of a network interface includes a network card connected to an Ethernet or other type of LAN. The I/O device(s) 308 are able to include one or more of the following: keyboard, mouse, monitor, display, printer, modem and other devices. Software used to perform the methods of the present invention are likely to be stored in the storage device 312 and memory 304 and processed as applications are typically processed.

Examples of suitable computing devices include a personal computer, a laptop computer, a computer workstation, a server, a mainframe computer, a handheld computer, a personal digital assistant, a cellular/mobile telephone, a smart appliance, a gaming console or any other suitable computing device.

To utilize the Nominal Population Metric, values are determined which are able to be incorporated into a clustering application to make selections from a pool of applicants. For example, if a university wants to have a diverse student body, but wants to abide by U.S. laws as well as maintain the importance of academics in admissions, the Nominal Population Metric is able to be incorporated with other criteria such as GPA and SAT scores, to admit students based on a variety of criteria including race, gender and other non-numerical criteria.

In operation, a set of entities is obtained to be compared. For example, a university receives admissions applications from high school students wanting to attend the university. Each of the entities in the set of entities is compared to obtain a difference measure. Using data from the comparisons, a coverage amount is determined for each attribute pair within the entities. For example, a coverage amount is determined for race for White-Black pairs, White-Hispanic pairs and so on. The coverage amount is determined by how often those pairs are encountered in the entities. To find similarities in the entities, the coverage amount is used without further modification. To find differences in the entities, the coverage amount is then subtracted from 100% or 1.00, so that less common attributes carry more weight than more common attributes. The coverage amounts are then able to be used in clustering algorithms which incorporate the coverage amounts with other data. For example, in addition to other information provided on an admissions application such as GPA and SAT score, the nominal population metrics are able to be incorporated as well, to provide an even better selection of admitted applicants. In an alternative embodiment, instead of comparing pairs of the applications, a distribution is determined for each attribute. For example, the distribution for white students is determined to be 70% of the applications and for black students, 15% of the applications. Using the distribution, a difference of a nominal attribute (the difference between two distributions) is calculated by multiplying the two values and subtracting the product from 1. For example, to determine the nominal difference between White and Black, their distributions are multiplied and subtracted from 1. The nominal difference is then able to be used in clustering computations. The computations for determining nominal population metrics are able to be performed on any suitable computing device.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the appended claims.

What is claimed is:

1. A method of determining non-numerical population metrics using a computing device comprising:
   a. comparing a plurality of entities with a processor of the computing device thereby forming one or more entity comparisons, wherein each entity has a common non-numerical attribute and corresponding non-numerical value such that the one or more entity comparisons each associate two of the corresponding non-numerical values forming a non-numerical attribute value pair;
   b. determining a coverage percentage for one or more of the non-numerical attribute value pairs based on the one or more entity comparisons with the processor;
   c. storing the coverage percentage in a memory of the computing device; and
   d. determining a non-numerical population metric based on the coverage percentage with the processor;
   wherein the two of the corresponding non-numerical values forming the non-numerical attribute value pair come from different entities of the plurality of entities.

2. The method of claim 1 wherein the coverage percentage is determined by an occurrence frequency of each of the one or more of the non-numerical attribute value pairs among all the pairs formed by the entity comparisons for the common non-numerical attribute.

3. The method of claim 1 further comprising determining an inverse coverage percentage by subtracting the coverage percentage from 100%.

4. The method of claim 3 further comprising selecting one or more entities from the plurality of entities based in part on the inverse coverage percentage.

5. The method of claim 1 wherein the one or more non-numerical attributes include at least one of race, gender, major, extra curricular activity, wealth, nationality and country of origin.

6. The method of claim 1 wherein the plurality of entities are selected from the group consisting of admissions applications, job applications and scholarships.

7. The method of claim 1 wherein the attribute value pairs and the coverage percentage are contained in a non-numerical population matrix.

8. The method of claim 1 wherein the computing device is selected from the group consisting of a personal computer, a laptop computer, a computer workstation, a server, a mainframe computer, a handheld computer, a personal digital assistant, a cellular/mobile telephone, a smart appliance and a gaming console.

9. The method of claim 1, wherein one or more difference measures are calculated based on the comparing of the plurality of entities.

10. The method of claim 1, wherein each of the entities is limited to a single non-numerical value for the common non-numerical attribute.

11. A computing device comprising:
   a. a processor;
   b. a memory coupled to the processor; and
   c. an application stored in the memory and processed by the processor, the application for:
      i. comparing a plurality of entities thereby forming one or more entity comparisons, wherein each entity has a common non-numerical attribute and corresponding non-numerical value such that the one or more entity comparisons each associate two of the corresponding non-numerical values forming a non-numerical attribute value pair; and
      ii. determining a coverage percentage for one or more of the non-numerical attribute value pairs based on the one or more entity comparisons;
   wherein the processor and the memory are integrated into a single device, and further wherein the two of the corresponding non-numerical values forming the non-numerical attribute value pair come from different entities of the plurality of entities.

12. The device of claim 11 wherein the coverage percentage is determined by an occurrence frequency of each of the one or more of the non-numerical attribute value pairs among all the pairs formed by the entity comparisons for the common non-numerical attribute.

13. The device of claim 11 wherein the application further determines an inverse coverage percentage from the coverage percentage by subtracting the coverage percentage from 100%.

14. The device of claim 11, wherein one or more difference measures are calculated based on the comparing of the plurality of entities.

15. A system comprising:
   a. a processing component;
   b. a memory component coupled to the processing component; and
   c. an application component stored in the memory component and processed by the processing component, the application component for:
      i. comparing a plurality of entities thereby forming one or more entity comparisons, wherein each entity has a common non-numerical attribute and corresponding non-numerical value such that the one or more entity comparisons each associate two of the corresponding non-numerical values forming a non-numerical attribute value pair; and
      ii. determining a coverage percentage for one or more of the non-numerical attribute value pairs based on the one or more entity comparisons;
   wherein the two of the corresponding non-numerical values forming the non-numerical attribute value pair come from different entities of the plurality of entities.

16. The device of claim 11, wherein each of the entities is limited to a single non-numerical value for the common non-numerical attribute.

17. The system of claim 15, wherein one or more difference measures are calculated based on the comparing of the plurality of entities.

18. The method of claim 9 wherein the difference measures are contained within a similarity matrix.

19. The system of claim 15, wherein each of the entities is limited to a single non-numerical value for the common non-numerical attribute.

* * * * *